United States Patent [19]
Heusser

[11] 3,788,138
[45] Jan. 29, 1974

[54] TEXTILE-TESTING APPARATUS FOR MEASURING THE CROSS-SECTION OF YARNS ROVINGS AND SLIVERS AND PARTICULARLY FOR DETECTING FLUCTUATIONS IN CROSS-SECTION

[75] Inventor: Eduard Heusser, Uster, Switzerland
[73] Assignee: Zellweger Ltd., Uster, Switzerland
[22] Filed: Aug. 27, 1971
[21] Appl. No.: 175,683

[52] U.S. Cl. .................................................. 73/160
[51] Int. Cl. ........................................... G01n 27/24
[58] Field of Search..... 73/160, 95.5; 28/64; 226/92

[56] References Cited
UNITED STATES PATENTS
1,962,028   6/1934   Murphy .............................. 73/95.5

Primary Examiner—Richard C. Queisser
Assistant Examiner—Denis E. Corr
Attorney, Agent, or Firm—Craig, Antonelli & Hill

[57] ABSTRACT

In a textile testing apparatus, a rocker arm is provided which is pivotable about a pivot point between a conveying point and a testing point and a yarn gripper is disposed on one end of the rocker arm for selectively grasping the yarn. A testing arrangement is provided at the testing point having a plurality of spaced test devices each relating to different ranges of yarn sizes and guide means adjustable as to position for guiding the yarn to a selected test device.

5 Claims, 1 Drawing Figure

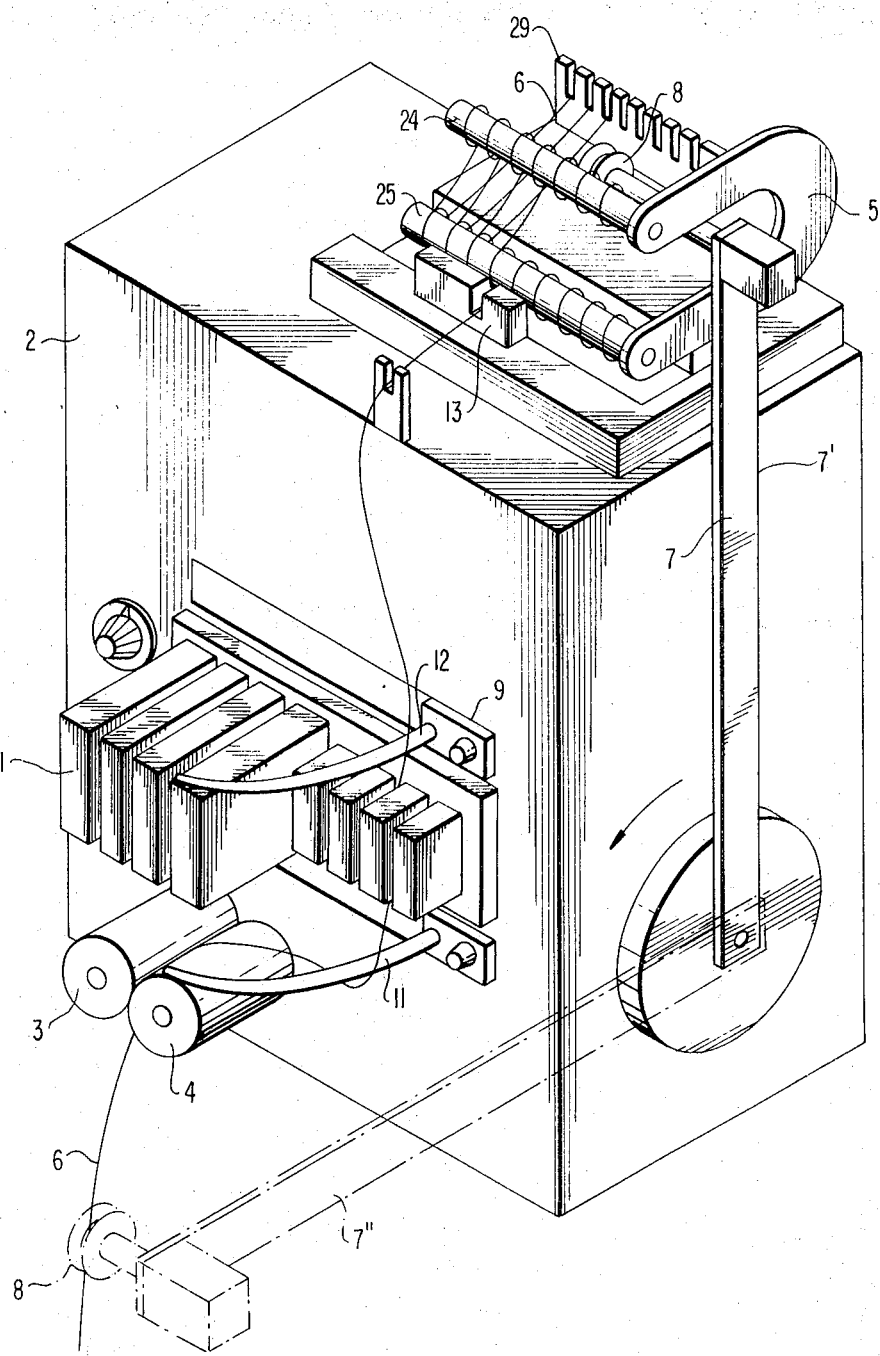

TEXTILE-TESTING APPARATUS FOR MEASURING THE CROSS-SECTION OF YARNS ROVINGS AND SLIVERS AND PARTICULARLY FOR DETECTING FLUCTUATIONS IN CROSS-SECTION

This invention relates to textile-testing apparatus for measuring the cross section of yarns, rovings and slivers, and particularly, for detecting fluctuations in the cross section thereof.

Testing instruments for the measurement of the cross section of a material while the material is moving are known per se. They can function on the capacitive, optical, pneumatic or on any other suitable principle. The material to be tested is guided through a measuring unit which can be divided into individual measuring zones in order to be able to cover a wide range of different cross sections. The material to be tested is run off on a conveyor from a delivery bobbin or spool which enables different draw-off rates to be adjusted. The variations in cross section detected in the measuring unit are converted into electrical signals which, after suitable amplification, are delivered to indicating and/or recording instruments. Other forms of instruments designed to be connected to the testing instrument can evaluate the electrical signal obtained according to additional criteria.

Since it is only possible to use random samples for checking the cross-sectional form, a plurality of individual samples has to be selected in order to obtain representative results and the results obtained from these samples must be converted under known laws of statistics into values that are applicable to the material to be tested as a whole. This means that after each individual test has been completed the testing instrument has to be provided with a fresh supply of material to be tested and, on completion of rebalancing, the next testing cycle initiated. Hence, the instrument has to be kept under constant supervision. In addition to keeping watch on and evaluating the results, the operator has hitherto also been responsible for changing the material to be tested.

An object of the present invention is to obviate these disadvantages. Accordingly, the invention provides a textile-testing apparatus for measuring the cross section of yarns, rovings and slivers comprising an automatic yarn-changing mechanism which is operable at the end of a predetermined testing period to take a yarn from a spool in a prepared store of material to be tested and to introduce it into a measuring unit and into a conveyor and wherein a circuit is provided automatically to cooperate with the yarn-changing mechanism to monitor the functional settings of the testing apparatus.

The period of time required for each testing cycle per spool is preferably adjustable. In addition, the yarn-changing mechanism is designed in such a way that any number, for example up to 10, spools can be introduced and prepared for testing and the entire testing operation can be carried out by a single operator without further assistance.

A textile-testing apparatus constructed according to the invention will now be described with reference to the accompanying drawing wherein the single FIGURE is a perspective view of one exemplary embodiment of the present invention.

Details of the textile-testing apparatus are only described insofar as they are of significance to the invention. An unwinding mechanism with two counter-rotating delivery rollers 3 and 4, which may be separated by suitable control circuitry at the proper times, is arranged in a housing 2 which accommodates a measuring unit 1 and the necessary electrical circuit elements which may take any conventional form operating on any known detection principle; for example, a capacitive unit such as disclosed in copending application, Ser. No. 168,150, filed Aug. 2, 1971, may be used. The top of the housing 2 carries a laterally shiftable clamping means 5 for holding a number of yarns 6 to be tested in succession. The individual yarns 6 may be each drawn from a respective spool (not shown) supported at any suitable location behind the clamping means 5. The yarns 6 pass through channels in guide plate 29 and around lower yarn clamp 25, and the end is held by upper yarn clamp 24, as disclosed in my copending application Ser. No. 175,684, filed Aug. 27, 1971. The side of the housing carries a conveyor for gripping and inserting a yarn into the measuring unit 1 and into the unwinding mechanism between rollers 3 and 4. This conveyor includes a rocker arm 7 and a yarn gripper 8 mounted on one end of the arm.

A time switch (not shown), which may be actuated by the conveyor and operated by the unwinding mechanism, sets a predetermined time interval during which a given yarn 6 from a spool is to be measured. At the end of this time interval, the rocker arm 7 is rotated from a starting position 7' by an internal motor (not shown) and the yarn gripper 8 briefly opens and then closes to grip the leading yarn of a number of yarns clamped one behind the other. The clamping means 5 is indexed after each actuation of the rocker arm 7 so that the next yarn will be in position to be seized by the yarn gripper 8. As the rocker arm 7 continues to rotate into its lowermost position 7'', the yarn is brought into the vicinity of the measuring unit 1 and at the same time, is inserted between the delivery rollers 3 and 4 which are at this time briefly separated from one another.

In order safely to introduce the yarn into the measuring unit 1 or, in the case of a capacitive testing instrument, into the measuring capacitor adapted to suit the particular yarn cross section, guide horns 11 and 12 are provided on both the upper and lower sides of the measuring unit. These guide horns are mounted in displaceable slots, so that they may be adjusted in relation to the adjacent measuring slots which provide the measuring ranges selected by means of the knobs 9. Thus, by properly positioning the horns 11 and 12, the yarn will be guided into the proper measuring slot representing the size range thereof when the rocker arm 7 is rotated to carry the yarn downwardly to the unwinding mechanism 3 and 4. After the yarn has been inserted, a further brief opening of the clip 8 releases the yarn which is then run off from the spool by the delivery rollers 3 and 4.

The guide and direction-changing means of the clamping arrangement 5, which is disclosed in more detail in my copending application, Ser. No. 175,684, filed Aug. 27, 1971, are arranged in such a way that the yarn being unwound passes through a cutting attachment 13. The cutting attachment is actuated more or less simultaneously with the start of movement of the rocker arm 7 for inserting the next sample of yarn; as a result of which, the sample of yarn being unwound up until then is cut.

The measuring part of the testing apparatus (which is known per se) contains means for basically adjusting the results of the measurement. A first basic adjustment or setting is the zero balance, i.e., the verification of a zero indication when the measuring unit 1 is empty. Various external or internal influences can cause the capacity of the measuring unit to undergo changes which produce the same indications as changes in the cross section of the yarn situated inside the measuring unit. For this reason, the indication has to be periodically checked when the measuring unit is empty. A switch controlled by the rocker arm 7 then actuates a balancing mechanism which checks the zero-point setting of the testing instrument during the period elapsing between departure of the preceding yarn sample and entry of the next yarn sample and corrects any deviations detected.

Another basic setting is the mean-value balance. Since every yarn has differences in its cross section that fluctuate about a mean value and since on the other hand the size of these fluctuations is related to the mean value of the yarn cross section, this mean value has first to be determined and kept constant by adjusting the electrical output. In the textile-testing apparatus according to the invention, this is achieved by virtue of the fact that after a yarn sample has been inserted and the testing cycle started, the mean value of the electrical output corresponding to the yarn cross section is automatically adjusted to a predetermined value and only thereafter is the size of the deviations in the yarn cross section from this mean value evaluated.

The design of circuits for the zero-point setting on the one hand and the mean value setting on the other hand does not call for any particular effort on the part of the person skilled in the art and can therefore be assumed to be known.

I claim:

1. In a textile-testing apparatus for measuring the cross section of yarns, rovings and slivers including automatic yarn changing means for sequentially providing yarns from respective spools to a conveying point and conveying means for conveying said yarns from said conveying point to a testing point comprising a rocker arm pivotable about a pivot point between said conveying point and said testing point and a yarn gripper disposed on one end of said rocker arm for selectively grasping said yarns.

2. A textile-testing apparatus as defined in claim 1, including testing means for testing said yarns having a plurality of spaced test devices each relating to different ranges of yarn sizes, and guide means adjustable as to position for guiding the yarn conveyed by said conveying means to a selected testing device.

3. A textile-testing apparatus as defined in claim 2 wherein said guide means includes a pair of curved guide projections disposed on respective sides of said test devices and slideable along said test devices into alignment with respective ones thereof.

4. A textile-testing apparatus as defined in claim 2, including means for cutting a yarn which has been tested prior to the conveyance of another yarn to said testing means by said conveying means.

5. A textile-testing apparatus as defined in claim 2, wherein a pair of oppositely rotating rollers is provided at said testing point on the opposite side of said testing means from said yarn changing means for receiving and driving said yarn through said testing means.

* * * * *